(12) United States Patent
Choi et al.

(10) Patent No.: US 8,922,161 B2
(45) Date of Patent: Dec. 30, 2014

(54) THREE-DIMENSIONAL GLASSES AND SYSTEM FOR WIRELESS POWER TRANSMISSION

(75) Inventors: Sung-jin Choi, Anyang-si (KR); Kang-hyun Yi, Yesan-gun (KR); Myoung-jun Lee, Bucheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 619 days.

(21) Appl. No.: 13/102,140

(22) Filed: May 6, 2011

(65) Prior Publication Data

US 2012/0223674 A1    Sep. 6, 2012

Related U.S. Application Data

(60) Provisional application No. 61/333,353, filed on May 11, 2010.

(30) Foreign Application Priority Data

Mar. 3, 2011    (KR) .......................... 10-2011-0019125

(51) Int. Cl.
| | | |
|---|---|---|
| H02J 7/00 | (2006.01) | |
| H02J 7/02 | (2006.01) | |
| H04N 13/04 | (2006.01) | |
| H01F 38/14 | (2006.01) | |

(52) U.S. Cl.
CPC ............ *H02J 7/025* (2013.01); *H04N 13/0438* (2013.01); *H04N 2213/008* (2013.01); *H01F 38/14* (2013.01)
USPC ............................. 320/108; 320/114; 320/115

(58) Field of Classification Search
CPC ........................................................ H02J 7/025
USPC .......................................................... 320/108
See application file for complete search history.

(56) References Cited

U.S. PATENT DOCUMENTS

| | | | |
|---|---|---|---|
| 7,764,046 B2 | 7/2010 | Osada | |
| 7,944,172 B2 | 5/2011 | Osada | |
| 8,847,556 B2 | 9/2014 | Osada | |

(Continued)

FOREIGN PATENT DOCUMENTS

| | | |
|---|---|---|
| CN | 101136556 A | 3/2008 |
| EP | 2 429 058 A2 | 3/2012 |
| WO | 2009/033136 A1 | 3/2009 |

OTHER PUBLICATIONS

Communication dated Feb. 14, 2013 issued by the European Patent Office in counterpart European Patent Application No. 11164046.2.

(Continued)

*Primary Examiner* — Edward Tso
*Assistant Examiner* — Ahmed Omar
(74) *Attorney, Agent, or Firm* — Sughrue Mion, PLLC

(57) ABSTRACT

Three-dimensional (3D) glasses and a system for wireless power transmission are provided. The 3D glasses include a frame, a resonance reception part which includes a reception conductive wire loop and a resonance capacitor for wireless charging, a rectification part which rectifies a voltage generated by the resonance reception part, and a charging part which charges a battery using the rectified voltage. The frame includes a first temple, a second temple, a first lens holder part, a second lens holder part, and a bridge part connecting the first lens holder part and the second lens holder part.

29 Claims, 6 Drawing Sheets

(56) References Cited

U.S. PATENT DOCUMENTS

| | | |
|---|---|---|
| 2002/0154518 A1 | 10/2002 | Elferich et al. |
| 2007/0258039 A1 | 11/2007 | Duston et al. |
| 2008/0001735 A1 | 1/2008 | Tran |
| 2008/0079396 A1* | 4/2008 | Yamazaki et al. ............ 320/128 |
| 2008/0252254 A1 | 10/2008 | Osada |
| 2010/0045928 A1 | 2/2010 | Levy |
| 2010/0109445 A1 | 5/2010 | Kurs et al. |
| 2010/0177277 A1* | 7/2010 | Kokonaski et al. ........... 351/168 |
| 2010/0283425 A1 | 11/2010 | Osada |
| 2011/0215768 A1 | 9/2011 | Osada |
| 2011/0260681 A1* | 10/2011 | Guccione et al. ............. 320/108 |

OTHER PUBLICATIONS

Communication dated Dec. 3, 2013, issued by the European Patent Office in counterpart European Application No. 11 164 046.2.
Communication dated Aug. 29, 2014, issued by the State Intellectual Property Office of P.R. China in counterpart Chinese Application No. 201110128026.0.

* cited by examiner

<TRANSMISSION CRADLE>

<CONFIGURATION OF RESONATOR>

<INTERIOR CONFIGURATION>

THREE-DIMENSIONAL GLASSES AND SYSTEM FOR WIRELESS POWER TRANSMISSION

CROSS-REFERENCE TO RELATED APPLICATION

This application claims the benefit of U.S. Provisional Application No. 61/333,353, filed May 11, 2010 and claims priority from Korean Patent Application No. 10-2011-0019125 filed on Mar. 3, 2011, in the Korean Intellectual Property Office, the disclosures of which are incorporated herein by reference in their entirety.

BACKGROUND

1. Field

Methods and apparatuses consistent with exemplary embodiments relate to three-dimensional (3D) glasses which operate in association with a 3D display apparatus in order to view a 3D image, and a system for wireless power transmission.

2. Description of the Related Art

In recent years, display apparatuses able to provide not only two-dimensional (2D) images but also stereoscopic 3D images have been developed. In particular, a display apparatus for viewing stereoscopic 3D images may be a glasses-type display apparatus which uses special glasses or a non-glass type display apparatus which does not require glasses.

A glasses-type display apparatus used with special glasses may use a color filter method in which an image is separated into a left-eye image and a right-eye image using complementary color filters, a polarizing filter method which separates the image using a light-shielding effect based on a combination of orthogonal polarization elements, or a shutter glasses method in which the left-eye and right-eye of a viewer are alternately blocked in response to a sync signal in coordination with the projection of the left-eye image and the right-eye image onto a display screen.

In order to provide a stereoscopic 3D image, a display apparatus using the shutter glasses method controls the left-eye glass and the right-eye glass of a pair of 3D glasses to be alternately tuned on or off in response to the sync signal transmitted from the display apparatus.

In other words, power for driving the 3D glasses for viewing the 3D image is needed. In order to supply power to the 3D glasses in a related-art method, a disposable battery is inserted into the glasses or the 3D glasses are charged using a universal serial bus (USB) cable. The method requiring the user of a disposable battery is inconvenient in that it requires the replacement of the battery and may be expensive. Also, the method of charging the 3D glasses using a USB cable inconveniently requires the use of the USB cable every time the 3D glasses are charged, and it may spoil the beauty of the 3D glasses.

Therefore, there is a demand for a method of wirelessly charging 3D glasses with ease.

SUMMARY

One or more exemplary embodiments may overcome the above disadvantages and other disadvantages not described above. However, it is understood that one or more embodiments are not required to overcome the disadvantages described above, and may not overcome any of the problems described above.

One or more exemplary embodiments provide 3D glasses which include a resonance reception part which comprises a reception conductive wire loop and a resonance capacitor connected to the reception conductive loop. The 3D glasses may be charged by an external power transmission apparatus having a resonance transmission part, and a system for wireless power system.

According to an aspect of an exemplary embodiment, there is provided 3D glasses, including a frame, a resonance reception part which includes a reception conductive wire loop and a resonance capacitor connected to the reception conductive wire loop, a rectification part which rectifies a voltage generated by the resonance reception part, and a charging part which charges a battery using the rectified voltage. The frame may include a first temple, a second temple, a first lens holder part, a second lens holder part, and a bridge part connecting the first lens holder part and the second lens holder part.

The reception conductive wire loop may be mounted in the frame and may extend along an edge of the frame.

The reception conductive wire loop may be mounted in the frame and may extend along an edge of the first lens holder part.

The resonance capacitor may be mounted in one of the first lens holder, the bridge part, and the first temple.

The rectification part may be mounted in one of the first lens holder part, the bridge part, and the first temple.

The charging part may be mounted in one of the first lens holder part, the bridge part, and the first temple.

The resonance reception part may further include a pick-up conductive wire loop in which a current generated in the reception conductive wire loop is induced.

The pick-up conductive wire loop may be mounted in the frame and may extend along an edge of the frame.

The pick-up conductive wire loop may be mounted in the frame and may extend along an edge of the first lens holder part.

The 3D glasses may further include a DC to DC conversion part which converts an output voltage of the rectification part into a voltage suitable for the charging part.

The charging part may include a charging integrated circuit (IC) for controlling a charging operation using an output voltage of the rectification part.

The reception conductive wire loop may be a printed circuit board (PCB) or a film PCB.

The 3D glasses may further include a wireless communication part, and a charging operation of at least one of the resonance reception part, the rectification part, and the charging part may be controlled according to control information received from the wireless communication part.

The wireless communication part may use Bluetooth.

According to an aspect of another embodiment, there is provided a system for wireless power transmission including a power transmission apparatus which includes a resonance transmission part which wirelessly transmits power, and a power reception apparatus which comprises a resonance reception part which wirelessly receives power, wherein the resonance transmission part includes a transmission conductive wire loop which is formed along an edge of the power transmission apparatus, and a first resonance capacitor which is connected to the transmission conductive wire loop, and the resonance reception part includes a reception conductive wire loop which is formed along an edge of the power reception apparatus and a second resonance capacitor which is connected to the reception conductive wire loop.

The power reception apparatus may further include a rectification part which rectifies a voltage generated by the resonance reception part, and a charging part which charges a battery using the rectified voltage.

The power reception apparatus may further include a DC to DC conversion part which converts an output voltage of the rectification part into a voltage suitable for the charging part.

The power reception apparatus may further include a charging IC which controls a charging operation using an output voltage of the rectification part.

The power transmission apparatus may further include a feeder conductive wire loop which induces a current in the transmission conductive wire loop.

The power reception apparatus may further include a pick-up conductive wire loop in which a current generated in the reception conductive wire loop is induced.

The reception conductive wire loop may be a PCB or a film PCB.

The transmission conductive wire loop may be a metal plate which consists of one of Cu, Al, and SPTE.

The power transmission apparatus may be a display panel.

The power transmission apparatus may be a cradle.

The power transmission apparatus may be one of a box and a cylinder within which the power reception apparatus fits.

The power reception apparatus may be 3D glasses.

The power reception apparatus may be a remote controller.

The power reception apparatus may further include a wireless communication part, and the power reception apparatus may control a charging operation of at least one of the resonance reception part, the rectification part, and the charging part according to control information received from the wireless communication part.

The wireless communication part may use Bluetooth.

Additional aspects and advantages of the exemplary embodiments will be set forth in the detailed description, will be obvious from the detailed description, or may be learned by practicing the embodiments.

BRIEF DESCRIPTION OF THE DRAWINGS

The above and/or other aspects will be more apparent from the following description of exemplary embodiments, with reference to the accompanying drawings, in which.

DETAILED DESCRIPTION OF THE EXEMPLARY EMBODIMENTS

Figure 1:
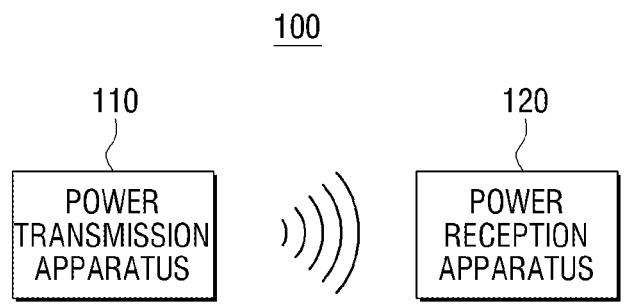
FIG. 1 is a block diagram illustrating a system for wireless power transmission according to an exemplary embodiment.

Hereinafter, embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the embodiments can be carried out without those specifically defined matters. Also, functions or elements known in the related art are not described in detail since they would obscure the embodiments with unnecessary detail.

FIG. 1 is a block diagram illustrating a system 100 for wireless power transmission according to an embodiment. As shown in FIG. 1, the system 100 for wireless power transmission includes a power transmission apparatus 110 for transmitting power wirelessly and a power reception apparatus 120 for receiving the power from the power transmission apparatus 100 wirelessly.

The power transmission apparatus 110 converts electric energy supplied from a power supply part into magnetic energy, and transmits the converted magnetic energy to the power reception apparatus 120 wirelessly through a resonance transmission part. The power transmission apparatus 110 may be implemented as a cradle for holding 3D glasses, a remote controller, a 3D display apparatus, or another device as would be understood by one of skill in the art.

In particular, the resonance transmission part included in the power transmission apparatus 110 includes a transmission conductive wire loop which is formed along an edge of the power transmission apparatus 110 and a first resonance capacitor which is connected to the transmission conductive wire loop. The power transmission apparatus 110 will be explained in detail with reference to FIG. 2 and FIGS. 4A to 4C.

The power reception apparatus 120 receives the magnetic energy transmitted from the power transmission apparatus 110 wirelessly through a resonance reception part, and converts the received magnetic energy into electric energy and stores the electric energy in a battery. The power reception apparatus 110 may be implemented as 3D glasses or a remote controller.

The resonance reception part of the power reception apparatus 120 includes a reception conductive wire loop which is formed along an edge of the power reception apparatus 120 and a second resonance capacitor which is connected to the reception conductive wire loop. The power reception apparatus 120 will be explained in detail with reference to FIG. 3 and FIGS. 5 to 7.

Figure 2:
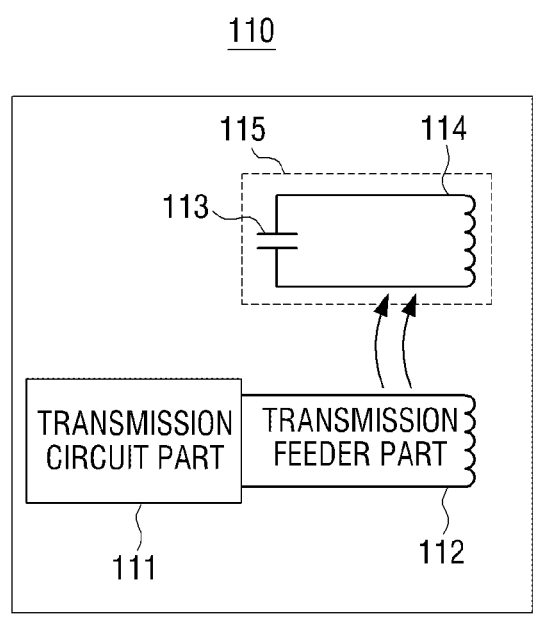
FIG. 2 is a block diagram illustrating a power transmission apparatus according to an exemplary embodiment.

Hereinafter, a method for wirelessly charging of the system 100 for wireless power transmission will be explained with reference to FIGS. 2 and 3. FIG. 2 is a block diagram illustrating the power transmission apparatus 110 according to an embodiment. As shown in FIG. 2, the power transmission apparatus 110 includes a transmission circuit part 111, a transmission feeder part 112, and a resonance transmission part 115 including a first resonance capacitor 113 and a transmission conductive wire loop 114.

The transmission circuit part 111 generates an alternating current (AC) waveform of a high frequency using a direct current (DC) voltage transmitted from a power supply part (not shown), and generates a magnetic field. Also, the transmission circuit part 111 generates a magnetic field concentrated on a resonant frequency. The transmission circuit part 110 generates the AC waveform of the high frequency (MHz level) and excites the transmission feeder part 112.

The transmission feeder part 112 excites the resonance transmission part 115 which is connected in an inductive coupling pattern, thereby inducing generation of a magnetic field concentrated on a specific frequency. The specific frequency may be 13.56 MHz. The transmission feeder part 112 includes a feeder conductive wire loop which induces an electric current in the resonance transmission part 115.

The resonance transmission part 115 generates the magnetic field concentrated on the specific frequency. The resonance transmission part 115 includes the transmission conductive wire loop 114 which is formed along the edge of the power transmission apparatus 110 and the first resonance capacitor 113 which is connected to the transmission conductive wire loop 114. The transmission conductive wire loop 114 may be a metal plate which consists of any one of Cu, Al, and Steel Plated-Tin, Electrolytic (SPTE).

In other words, the resonance transmission part 115 serves as an LC resonator so that the resonance transmission part 114 can change values of a capacitor and an inductor and thus change the quality factor (Q factor) and a resonant frequency.

As described above, the magnetic energy generated by the resonance transmission part 115 of the power transmission apparatus 110 is wirelessly transmitted to the power reception apparatus 120.

Figure 3:
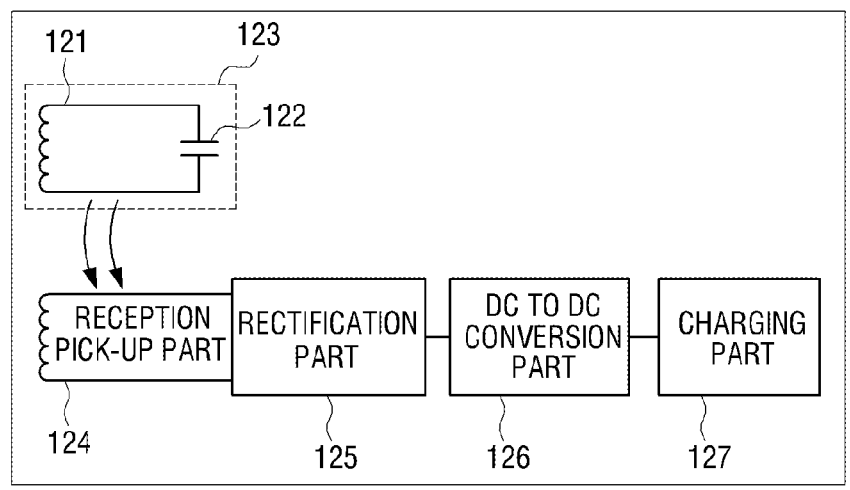
FIG. 3 is a block diagram illustrating a power reception apparatus according to an exemplary embodiment.

FIG. 3 is a block diagram illustrating the power reception apparatus 120 according to an embodiment. As shown in FIG. 3, the power reception apparatus 120 includes a resonance reception part 123 including a reception conductive wire loop 121 and a second resonance capacitor 122, a reception pick-up part 124, a rectification part 125, a DC to DC conversion part 126, and a charging part 127.

The resonance reception part 123 receives the magnetic energy having the specific frequency. More specifically, the resonance reception part 123 includes the reception conductive wire loop 121 which is formed along the edge of the power reception apparatus 120 and the second resonance capacitor 122 which is connected to the reception conductive wire loop 121. The reception conductive wire loop 121 may be formed using a printed circuit board (PCB) or a film PCB.

The resonance reception part 123 is activated by the magnetic field of the specific frequency generated in the resonance transmission part 115 such that an electric current flows in the resonance reception part 123.

The reception pick-up part 124 is inductive-coupled to the resonance reception part 123 to receive the energy from the resonance reception part 123. The reception pick-up part 124 includes a pick-up conductive wire loop in which the electric current generated in the reception conductive wire loop 121 is induced.

The rectification part 125 rectifies the AC voltage transmitted from the reception pick-up part 124 to a DC voltage. The rectification part 125 may include a bridge diode having four diodes and a capacitor serving as a filter. Another circuit for rectifying the AC to the DC may be used as the rectification part 125.

The DC to DC conversion part 126 adjusts an input voltage to be constant since the DC voltage rectified by the rectification part 125 may not always be constant.

The charging part 127 charges the rectified constant voltage. The charging part 127 may include a charging integrated circuit (IC) and a battery for controlling a charging operation using the output voltage of the rectification part 126. The battery may be a super capacitor.

The power reception apparatus 120 may further include a wireless communication part (not shown) for communicating with an external apparatus. The power reception apparatus 120 may control a charging operation of at least one of a resonance part including the resonance reception part 123 and the reception pick-up part 124, the rectification part 125 and the charging part 127 according to control information received through the wireless communication part.

The external apparatus may be a remote controller or a 3D display apparatus. In other words, the power reception apparatus 120 may stop or begin the charging operation according to control information received from a remote controller or the 3D display apparatus.

Also, the wireless communication part may be a Bluetooth module.

As described above, the power reception apparatus 120 is wirelessly charged by the magnetic field of the specific frequency so that charging is more convenient for the user.

Hereinafter, various exemplary embodiments of the power transmission apparatus 110 will be explained with reference to FIGS. 4A to 4C.

Figure 4A:
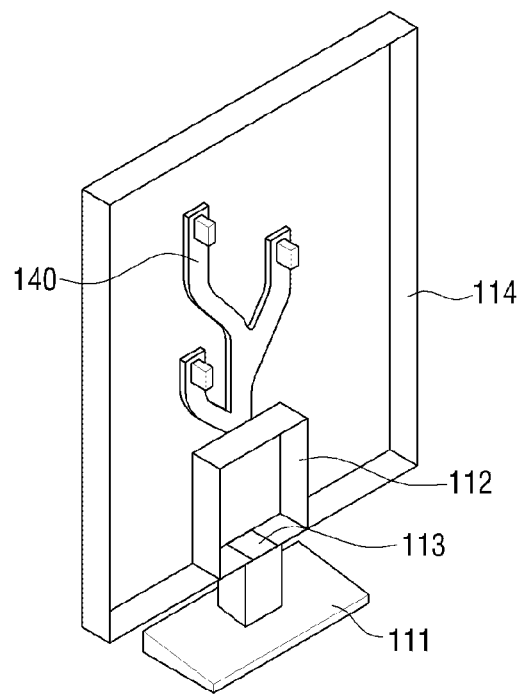
FIGS. 4A to 4C are views illustrating diverse types of power transmission apparatuses according to exemplary embodiments.

FIG. 4A is a view illustrating a case where the power transmission apparatus 110 is a stand type cradle according to an embodiment. The power transmission apparatus 110 of the stand type cradle may be a 3D glasses cradle including a holder 140 for holding 3D glasses or a remote controller.

As shown in FIG. 4A, the transmission circuit part 111 of the power transmission apparatus 110 of the stand type cradle is disposed in a lower support, the transmission feeder part 112 is disposed on a connecting portion between a frame and the holder 140, the first resonance capacitor 113 is located on a part of the frame located between the transmission feeder part 112 and the support, and the transmission conductive wire loop 114 is disposed in an outer frame of the power transmission apparatus 110.

However, this is merely an example, and the power transmission apparatus 110 may have a different configuration from that of the stand type cradle of FIG. 4A.

Figure 4B:
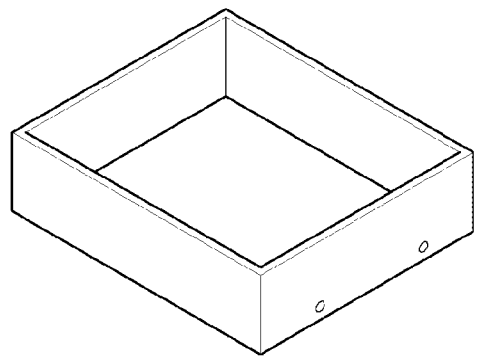
Figure 4B:
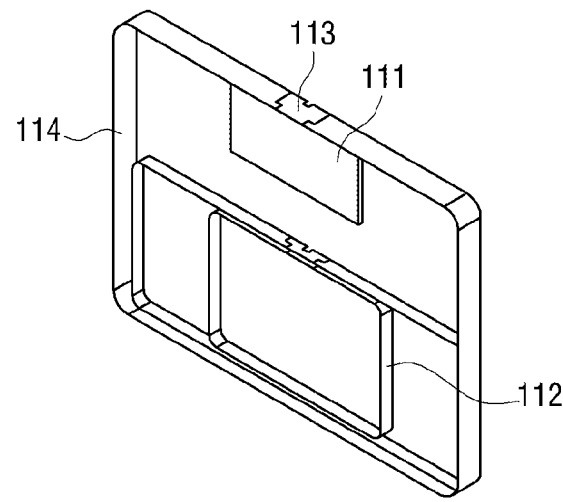
Figure 4B:
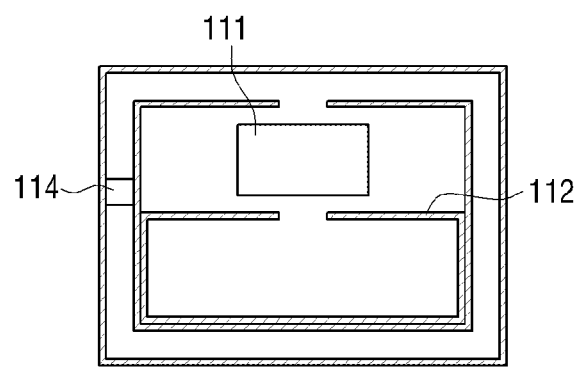

FIG. 4B is a view illustrating a case where the power transmission apparatus 110 is a box type cradle according to an embodiment. As shown in the first drawing on the top of FIG. 4B, the power transmission apparatus 110 of the box type cradle is a 3D glasses cradle of a box type on which or within which 3D glasses or a remote controller is placed. The second drawing of FIG. 4B illustrates a configuration of a resonator which is included in the power transmission apparatus 110 of the box type cradle. The third drawing of FIG. 4B illustrates an interior of the resonator.

As shown in FIG. 4B, the transmission circuit part 111 is disposed on a side of a frame, the transmission feeder part 112 is disposed in the frame, the first resonance capacitor 113 is disposed on an area between the transmission circuit part 111 and the frame, and the transmission conductive wire loop 114 is disposed in the frame of the resonator.

However, this is merely an example and the power transmission apparatus 110 may have a different configuration from that of the box type cradle shown in the second drawing of FIG. 4B.

Although the box type cradle has been described in FIG. 4B, the technical idea of the present disclosure may be applied to the power transmission apparatus 110 of a cylindrical cradle.

Figure 4C:
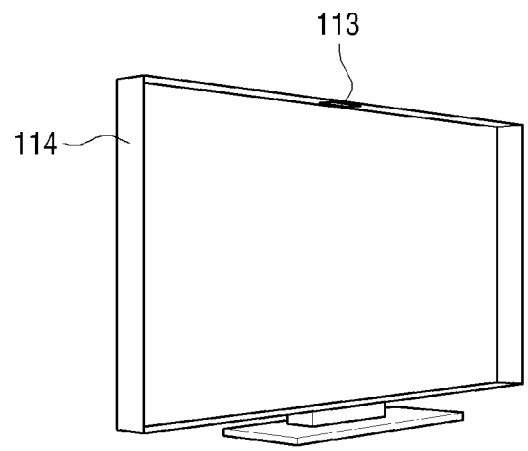

FIG. 4C is a view illustrating a case where the power transmission apparatus 110 is a 3D display apparatus according to an embodiment. In this embodiment, the power is transmitted wirelessly through the 3D display apparatus and the power reception apparatus 120 is charged by the 3D display apparatus.

As shown in FIG. 4C, the transmission conductive wire loop 114 is disposed in a frame of the 3D display apparatus and the first resonance capacitor 113 may be disposed on an area of the frame of the 3D display apparatus (for example, an upper middle area). The transmission circuit part 111 and the transmission feeder part 112 may be disposed on an external apparatus or a lower support.

However, this is merely an example and the power transmission apparatus 110 may have a different configuration from that of the 3D display apparatus of FIG. 4C.

Hereinafter, an embodiment in which the power reception apparatus 120 is 3D glasses will be explained with reference to FIGS. 5 to 6C.

Figure 5:
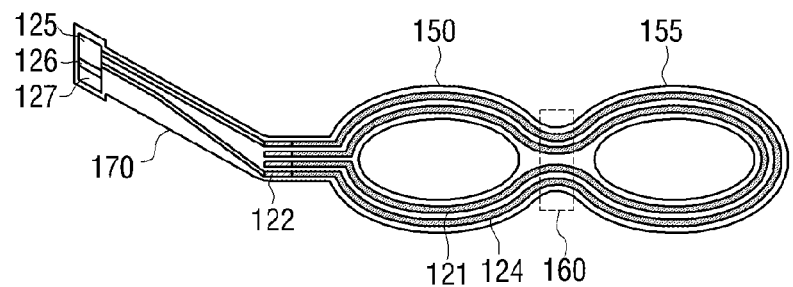
FIG. 5 is a view illustrating 3D glasses which is the power reception apparatus according to an exemplary embodiment.

FIG. 5 is a view illustrating a case in which the power reception apparatus 120 is a pair of 3D glasses according to an embodiment. The 3D glasses include a frame which includes a first lens holder part 150, a second lend holder part 155, and a bridge part 160 to connect the first lens holder part 150 and the second lens holder part 155, and a temple 170. Although one temple 170 is illustrated in FIG. 5, this is only for the convenience of explanation and it is clear that another temple 170 may be included at the other side of the 3D glasses.

Figure 6A:
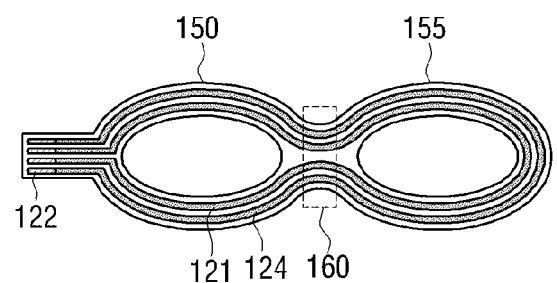
FIGS. 6A to 6C are views illustrating diverse types of 3D glasses according to exemplary embodiments.
Figure 6B:
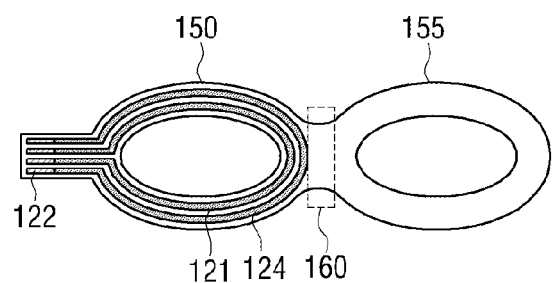

As shown in FIG. 5, the reception conductive wire loop 121 and the pick-up conductive wire loop 124 are mounted in the frame and follow an edge of the frame. More specifically, as shown in FIG. 6A, the reception conductive wire loop 121 and the pick-up conductive wire loop 124 may extend into the first lens holder part 150, the second lens holder part 155, and the bridge part 160. Alternately, as shown in FIG. 6B, the reception conductive wire loop 121 and the pick-up conductive wire loop 124 may be disposed in only the first lens holder part 150. As shown in FIG. 6C, the reception conductive wire loop 121 may be disposed in only the first lens holder part 150, whereas the pick-up conductive wire loop 124 may be extend into the first lens holder part 150, the second lens holder part 155, and the bridge part 160.

Figure 6C:
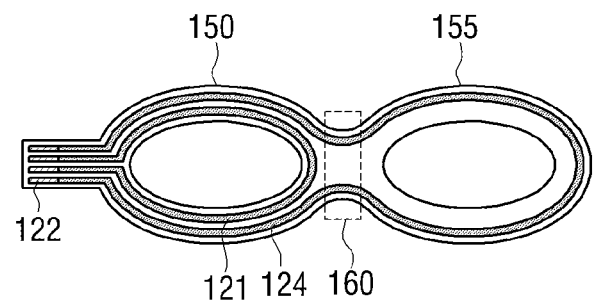

However, these are merely an examples, and the reception conductive wire loop 121 and the pick-up conductive wire loop 124 may be mounted in the frame in a different manner from those illustrated in FIGS. 6A to 6C.

As shown in FIG. 5, the second resonance capacitor 122 may be mounted in the temple 170. However, this is merely an example and the second resonance capacitor 122 may be mounted at any one of the first lens holder part 150 and the bridge part 160.

Also, as shown in FIG. 5, the rectification part 125, the DC to DC conversion part 126, and the charging part 127 may be disposed in an earpiece portion of the temple 170. However, this is merely an example and the rectification part 125, the DC to DC conversion part 126, and the charging part 127 may be disposed in different parts of the 3D glasses.

Figure 7:
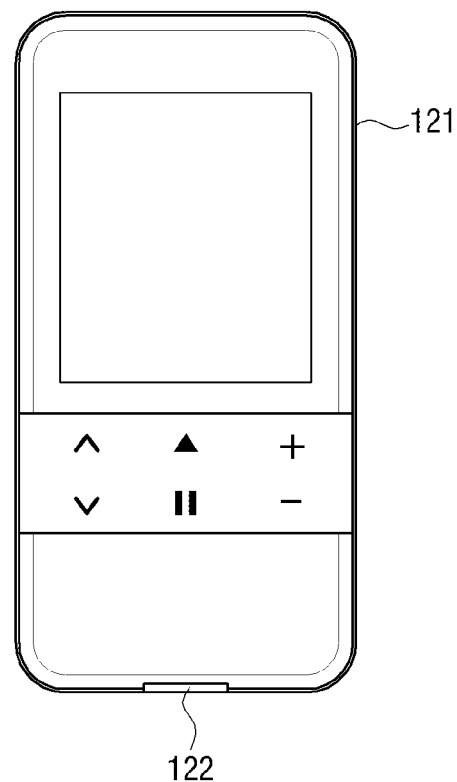
FIG. 7 is a view illustrating a remote controller which is the power reception apparatus according to an exemplary embodiment.

FIG. 7 is a view illustrating a case in which the power reception apparatus 120 is a remote controller according to an embodiment. In other words, the remote controller shown in FIG. 7 may be charged using the magnetic energy wirelessly transmitted from the external power transmission apparatus 110.

As shown in FIG. 7, the reception conductive wire loop 121 may be disposed in a frame of the remote controller and the second resonance capacitor 122 may be disposed in a part of the frame of the remote controller (for example, a lower end portion). Also, the pick-up conductive wire loop 124, the rectification part 125, the DC to DC conversion part 126, and the charging part 127 may also be included in the remote controller. However, this is merely an example and the power reception apparatus 120 may have a different configuration from that of the remote controller.

According to the various exemplary embodiments described above, the power reception apparatus 120 such as the 3D glasses or the remote controller is charged wirelessly without a cable so that charging the power reception apparatus 120 such as the 3D glasses or the remote controller is more convenient for a user.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. Three-dimensional (3D) glasses comprising:
    a frame;
    a resonance reception part comprising a reception conductive wire loop and a resonance capacitor connected to the reception conductive wire loop;
    a rectification part configured to rectify a voltage generated by the resonance reception part; and
    a charging part configured to charge a battery using the rectified voltage,
    wherein the frame comprises a first temple, a second temple, a first lens holder part, a second lens holder part, and a bridge connecting the first lens holder part and the second lens holder part,
    wherein the first temple, the second temple, the first lens holder part, the second lens holder part, and the bridge are in one body or in a plurality of bodies,
    wherein the reception conductive wire loop is mounted in the frame and extends along at least the first lens holder part, and
    wherein the 3D glasses are configured to be used for the viewing of 3D content.

2. The 3D glasses as claimed in claim 1, wherein the reception conductive wire loop is mounted in the frame and extends along an edge of the first lens holder part.

3. The 3D glasses as claimed in claim 1, wherein the resonance capacitor is mounted in one of the first lens holder, the bridge part, and the first temple.

4. The 3D glasses as claimed in claim 1, wherein the rectification part is mounted in one of the first lens holder part, the bridge part, and the first temple.

5. The 3D glasses as claimed in claim 1, wherein the charging part is mounted in one of the first lens holder part, the bridge part, and the first temple.

6. The 3D glasses as claimed in claim 1, wherein the resonance reception part further comprises a pick-up conductive wire loop in which a current generated in the reception conductive wire loop is induced.

7. The 3D glasses as claimed in claim 1, wherein
    the resonance reception part further comprises a pick-up conductive wire loop in which a current generated in the reception conductive wire loop is induced, and
    the pick-up conductive wire loop is mounted in the frame and extends along an edge of the frame.

8. The 3D glasses as claimed in claim 1, wherein
    the resonance reception part further comprises a pick-up conductive wire loop in which a current generated in the reception conductive wire loop is induced, and
    the pick-up conductive wire loop is mounted in the frame and extends along an edge of the first lens holder part.

9. The 3D glasses as claimed in claim 1, further comprising a DC to DC conversion part configured to convert an output voltage of the rectification part into a voltage suitable for the charging part.

10. The 3D glasses as claimed in claim 1, wherein the charging part comprises a charging integrated circuit configured to control a charging operation using an output voltage of the rectification part.

11. The 3D glasses as claimed in claim 1, wherein the reception conductive wire loop comprises one of a printed circuit board (PCB) and a film PCB.

12. The 3D glasses as claimed in claim 1, further comprising a wireless communication part,
wherein a charging operation of at least one of the resonance reception part, the rectification part, and the charging part is configured to be controlled according to control information received from the wireless communication part.

13. The 3D glasses as claimed in claim 12, wherein the wireless communication part is configured to perform wireless communication according to a Bluetooth standard.

14. A system for wireless power transmission, the system comprising:
a power transmission apparatus comprising a resonance transmission part configured to wirelessly transmit power; and
a power reception apparatus comprising a frame and a resonance reception part configured to wirelessly receive power,
wherein the power reception apparatus comprises three-dimensional (3D) glasses configured to be used for the viewing of 3D content,
wherein the resonance transmission part comprises:
a transmission conductive wire loop which is formed along an edge of the power transmission apparatus, and
a first resonance capacitor which is connected to the transmission conductive wire loop,
wherein the resonance reception part comprises:
a reception conductive wire loop which is formed along an edge of the power reception apparatus, and
a second resonance capacitor which is connected to the reception conductive wire loop,
wherein the frame comprises a first temple, a second temple, a first lens holder part, a second lens holder part, and a bridge connecting the first lens holder part and the second lens holder part,
wherein the first temple, the second temple, the first lens holder part, the second lens holder part, and the bridge are in one body or in a plurality of bodies, and
wherein the reception conductive wire loop is mounted in the frame and extends along at least the first lens holder part.

15. The system as claimed in claim 14, wherein the power reception apparatus further comprises:
a rectification part configured to rectify a voltage generated by the resonance reception part; and
a charging part configured to charge a battery using the rectified voltage.

16. The system as claimed in claim 15, wherein the power reception apparatus further comprises a DC to DC conversion part configured to convert an output voltage of the rectification part into a voltage suitable for the charging part.

17. The system as claimed in claim 15, wherein the power reception apparatus further comprises a charging integrated circuit configured to control a charging operation using an output voltage of the rectification part.

18. The system as claimed in claim 14, wherein the power transmission apparatus further comprises a feeder conductive wire loop configured to induce a current in the transmission conductive wire loop.

19. The system as claimed in claim 14, wherein the power reception apparatus further comprises a pick-up conductive wire loop in which a current generated in the reception conductive wire loop is induced.

20. The system as claimed in claim 14, wherein the reception conductive wire loop comprises one of a printed circuit board (PCB) and a film PCB.

21. The system as claimed in claim 14, wherein the transmission conductive wire loop comprises a metal plate which consists of one of Cu, Al, and SPTE.

22. The system as claimed in claim 14, wherein the power transmission apparatus comprises a display panel.

23. The system as claimed in claim 14, wherein the power transmission apparatus comprises a cradle.

24. The system as claimed in claim 14, wherein the power transmission apparatus comprises one of a box and a cylinder within which the power reception apparatus fits.

25. The system as claimed in claim 14, wherein the power reception apparatus comprises three-dimensional glasses.

26. The system as claimed in claim 14, wherein the power reception apparatus comprises a remote controller.

27. The system as claimed in claim 15, wherein the power reception apparatus further comprises a wireless communication part, and the power reception apparatus is configured to control a charging operation of at least one of the resonance reception part, the rectification part, and the charging part according to control information received from the wireless communication part.

28. The system as claimed in claim 27, wherein the wireless communication part is configured to perform wireless communication according to a Bluetooth standard.

29. A system for wireless power transmission, the system comprising:
a power transmission apparatus comprising a transmission conductive wire loop, a first resonance capacitor connected to the transmission conductive wire loop, and a feeder conductive wire loop configured to induce a current in the transmission conductive wire loop; and
a power reception apparatus comprising a reception conductive wire loop, a second resonance capacitor connected to the reception conductive wire loop, and a pick-up conductive wire loop, wherein the reception conductive wire loop is configured to generate a current in the pick-up conductive wire loop,
wherein the power reception apparatus comprises three-dimensional (3D) glasses configured to be used for the of 3D content,
wherein the three-dimensional glasses comprises a frame,
wherein the frame comprises a first temple, a second temple, a first lens holder part, a second lens holder part, and a bridge connecting the first lens holder part and the second lens holder part,
wherein the first temple, the second temple, the first lens holder part, the second lens holder part, and the bridge are in one body or in a plurality of bodies, and
wherein the reception conductive wire loop is mounted in the frame and extends along at least the first lens holder part.

\* \* \* \* \*